US012526560B2

(12) United States Patent
Ren

(10) Patent No.: US 12,526,560 B2
(45) Date of Patent: Jan. 13, 2026

(54) SPEAKER BOX

(71) Applicant: AAC Microtech (Changzhou) Co., Ltd., Jiangsu (CN)

(72) Inventor: Li Ren, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 163 days.

(21) Appl. No.: 18/525,896

(22) Filed: Dec. 1, 2023

(65) Prior Publication Data

US 2024/0340563 A1 Oct. 10, 2024

Related U.S. Application Data

(63) Continuation of application No. PCT/CN2023/087206, filed on Apr. 10, 2023.

(51) Int. Cl.
*H04R 1/02* (2006.01)

(52) U.S. Cl.
CPC ..................................... *H04R 1/02* (2013.01)

(58) Field of Classification Search
CPC ........................................................ H04R 1/02
See application file for complete search history.

(56) References Cited

U.S. PATENT DOCUMENTS

2023/0232141 A1* 7/2023 Cho ....................... H04R 1/025 381/395

FOREIGN PATENT DOCUMENTS

CN 216960110 U * 7/2022 ............. H04R 1/288

OTHER PUBLICATIONS

Machine translation of CN216960110U Year 2022.*

* cited by examiner

*Primary Examiner* — Andrew Sniezek
(74) *Attorney, Agent, or Firm* — Wiersch Law Group

(57) ABSTRACT

The present disclosure discloses a speaker box including a housing having a receiving space, and a speaker unit mounted on the housing and dividing the receiving space into a front chamber and a rear chamber isolated from each other; a support member is received in the rear chamber, including a first fixation portion fixed to the speaker unit, a second fixation portion fixed to the housing, and a support portion connecting the first fixation portion and the second fixation portion; a sound hole is provided on the housing configured to connect the front chamber with outside; the first fixation portion is fixed to a yoke; the speaker box in the present disclosure has higher fixation strength and higher drop reliability.

8 Claims, 5 Drawing Sheets

SPEAKER BOX

FIELD OF THE PRESENT DISCLOSURE

The present disclosure relates to electric-acoustic conversion technologies, especially relates to a speaker box applied in portable mobile terminals.

DESCRIPTION OF RELATED ART

With the development of the portable mobile terminal technologies, users have increasingly high requirements for the sound quality of portable mobile terminals. And a speaker box in portable mobile terminals is one of the necessary conditions to achieve this high-quality sound effect, which is configured to achieve conversion between electric signal and acoustic signal.

In related art, the speaker box includes a housing having a receiving space and a speaker unit mounted inside the housing. Therefore, strong fixation strength is required to ensure the drop reliability of the speaker box. For housing having a relatively regular shape, the yoke of the speaker unit is usually welded to the housing when the speaker unit has the same shape and similar size with the housing. However, for speaker box including a housing having an irregular shape, the yoke of the speaker unit is hard to be welded to the housing. To be specific, this welding structure has small welding area and low welding strength. Even if further fixation is achieved by applying adhesive on periphery of the speaker unit, it is also difficult to ensure the fixation strength between the speaker unit and the housing due to adhesive accumulation.

Therefore, it is necessary to provide an improved speaker box to overcome the problems mentioned above.

SUMMARY OF THE INVENTION

One object of the present disclosure is to provide a speaker box with higher fixation strength and higher drop reliability.

The speaker box includes a housing, having a receiving space; a speaker unit mounted on the housing and dividing the receiving space into a front chamber and a rear chamber isolated from each other, including: a diaphragm configured to vibrate to generate sound, enclosing the front chamber with the housing; and a yoke spaced apart from the housing; a support member received in the rear chamber, comprising a first fixation portion fixed to the speaker unit, a second fixation portion fixed to the housing, and a support portion connecting the first fixation portion and the second fixation portion; wherein a sound hole is provided on the housing configured to connect the front chamber with outside; the first fixation portion is fixed to the yoke.

As an improvement, the yoke includes a bottom surface away from the diaphragm along a vibration direction; the first fixation portion is welded to the bottom surface; the second fixation portion is welded to the housing.

As an improvement, the support member further includes a first arch portion connecting the first fixation portion and the support portion, and a second arch portion connecting the second fixation portion and the support portion; the support portion is spaced apart from the bottom surface along the vibration direction.

As an improvement, the housing includes an upper cover having the sound hole, and a bottom cover enclosing the receiving cavity with the upper cover; the second fixation portion is fixed to the bottom cover.

As an improvement, the bottom cover includes a bottom wall spaced apart from the bottom surface of the yoke along the vibration direction, and a side wall bending from outer edge of the bottom wall and extending to be fixed to the upper cover; the second fixation portion is welded to the side wall.

As an improvement, the housing is in a rectangular shape; the side wall includes two first wall opposite to each other and two second wall opposite to each other; the support member includes two second fixation portions; each of the two second fixation portions fixedly connects to one first wall separately.

As an improvement, the first wall extends along a long axis.

As an improvement, the first fixation portion includes a hollow portion penetrating thereon along the vibration direction.

As an improvement, a projection of the support portion overlaps with a projection of the bottom surface along the vibration direction.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
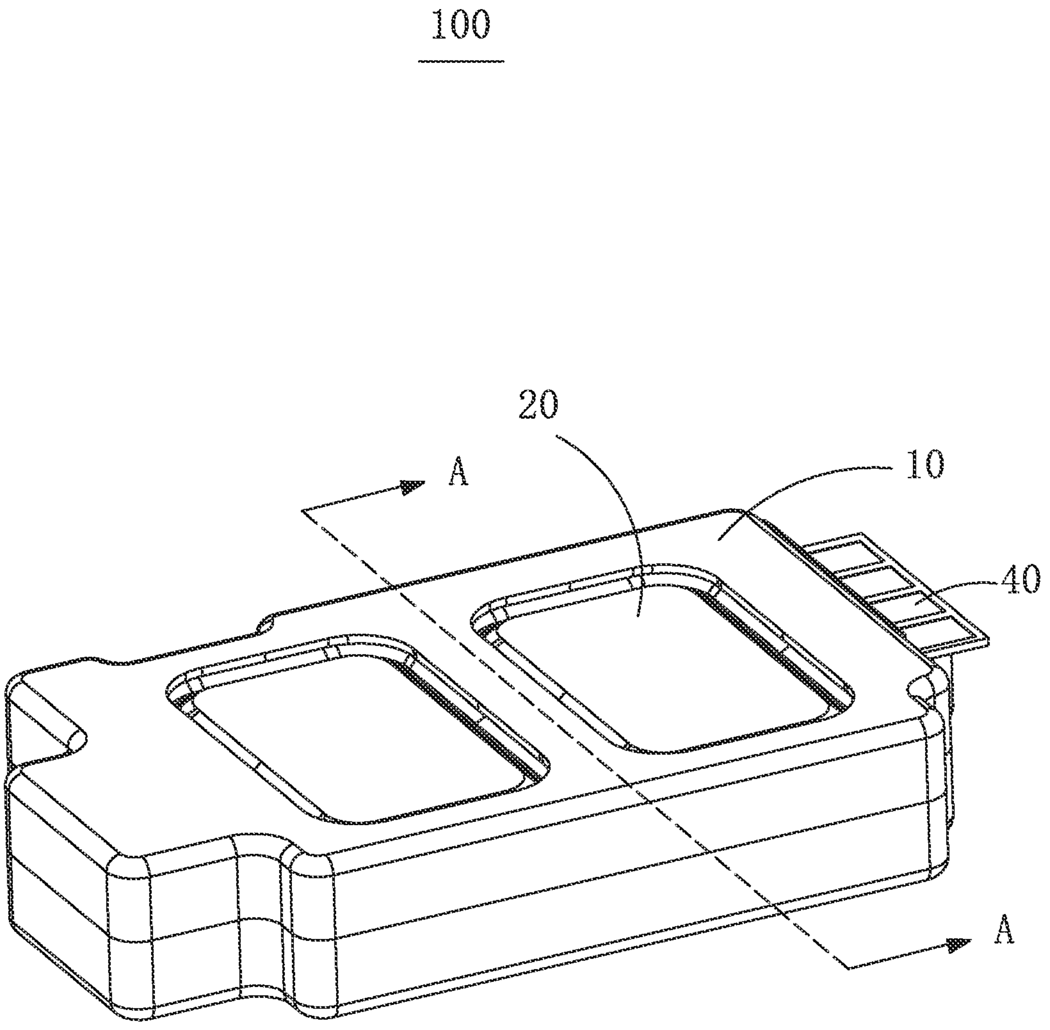
FIG. 1 is an isometric view of a speaker box in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-7 together, a speaker box 100 provided by an exemplary embodiment of the present disclosure includes a housing 10 having a receiving space 11, and a speaker unit 20 received in the receiving space 11. The speaker unit 20 is mounted on the housing 10 dividing the receiving space 11 into a front chamber 111 and a rear chamber 112 isolated from each other. To be specific, a sound hole 12 is provided on the housing 10 configured to connect the front chamber 111 with outside. Thus, the sound wave generated by the speaker unit 20 is transmitted to outside through the front chamber 111 and the sound hole 12 successively.

Figure 2:
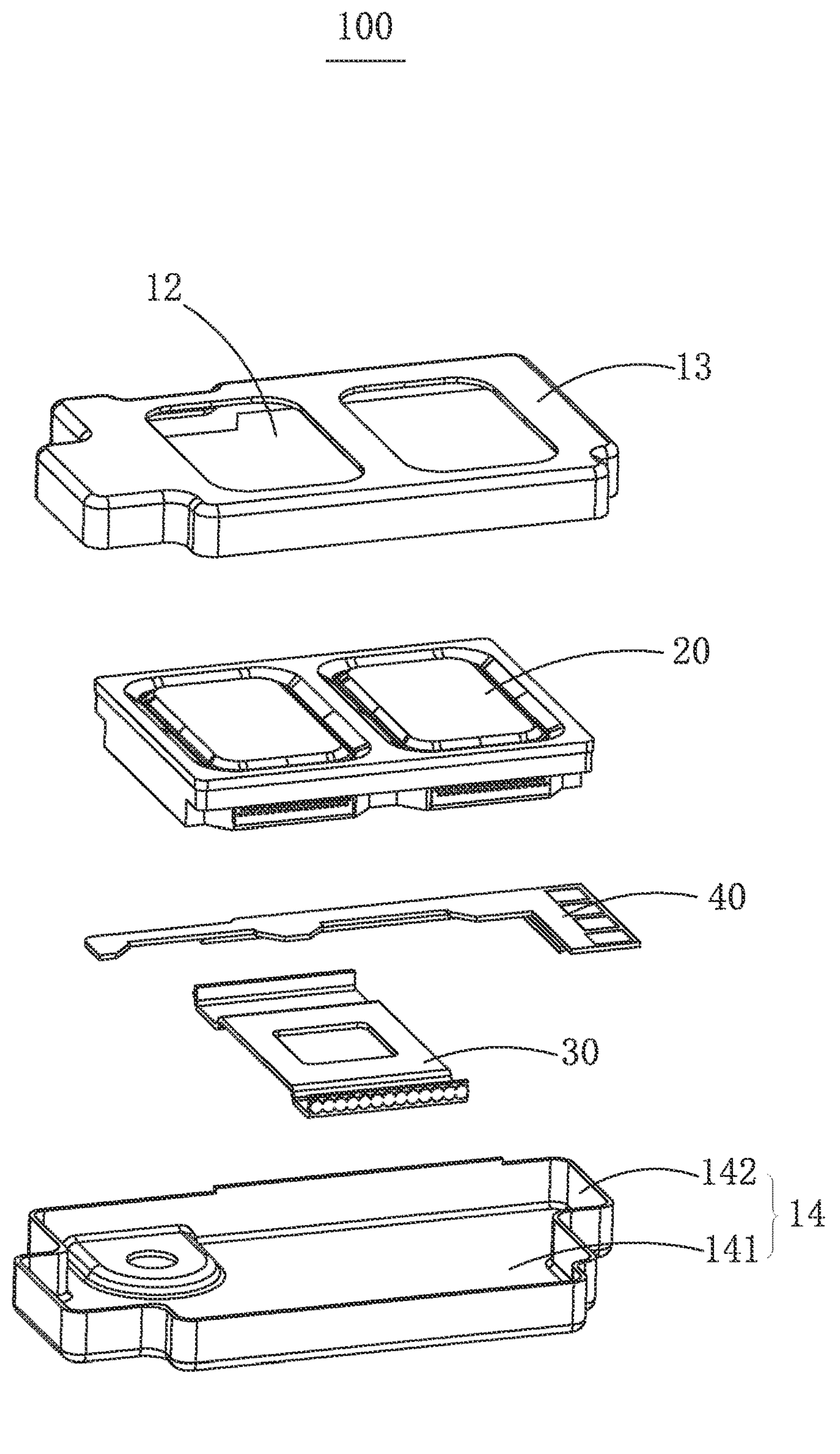
FIG. 2 is an exploded view of the speaker box in FIG. 1.
Figure 3:
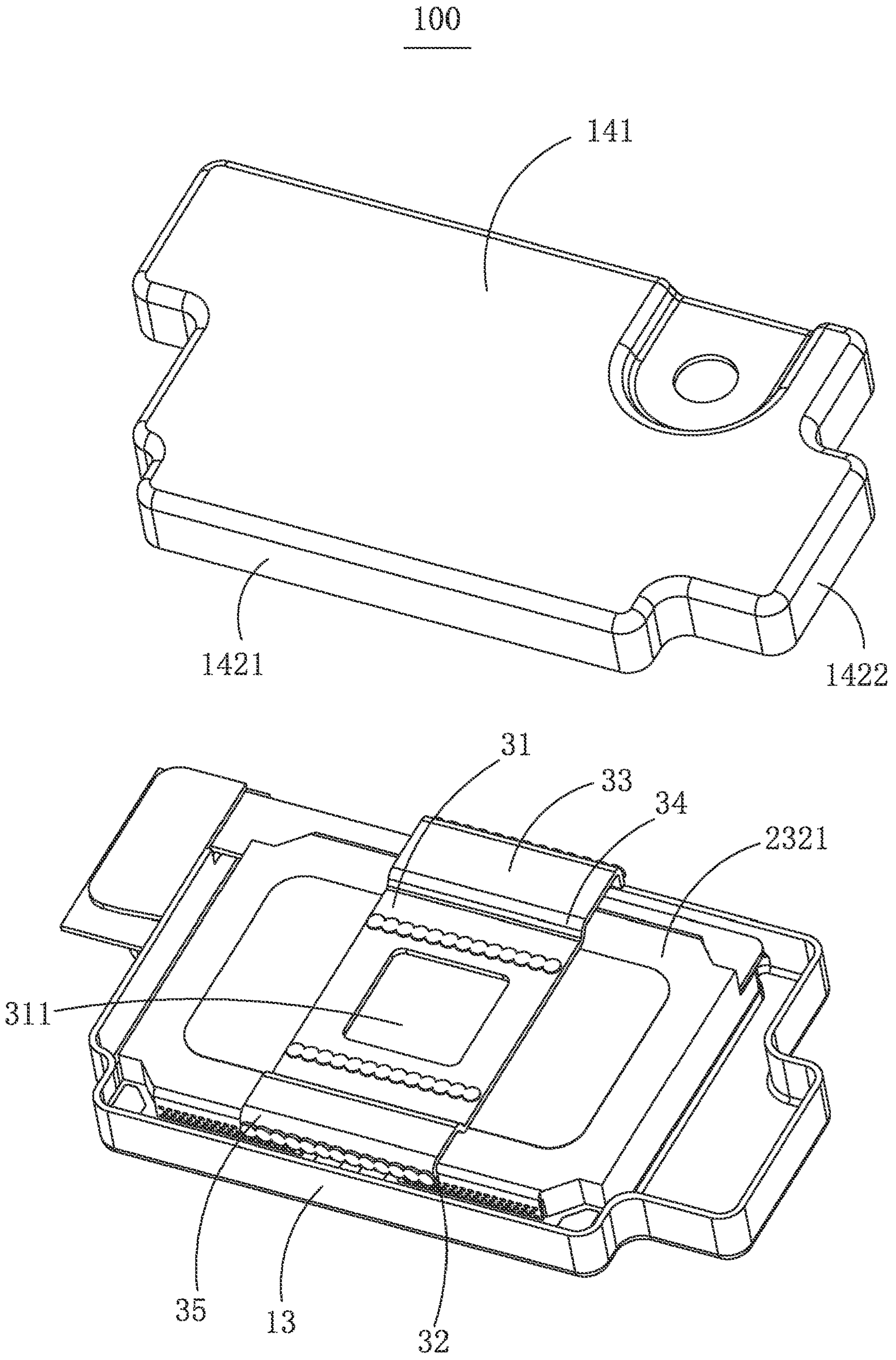
FIG. 3 is an exploded view of a speaker box in FIG. 1 in another perspective.
Figure 4:
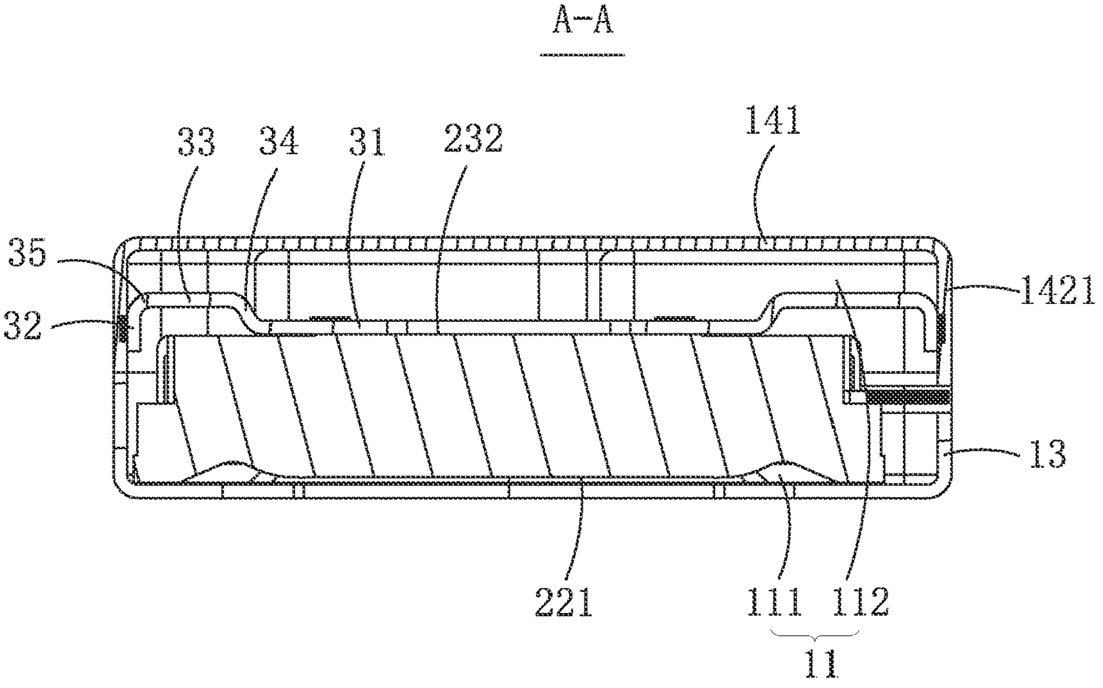
FIG. 4 is a cross-sectional view of the speaker box taken along line A-A in FIG. 1.

As shown in FIGS. 2-4, the housing 10 includes an upper cover 13 having the sound hole 12, and a bottom cover 14 enclosing the receiving cavity 11 with the upper cover 13. Furthermore, the bottom cover 14 includes a bottom wall 141 spaced apart from the speaker unit 20 along a vibration direction, and a side wall 142 bending from outer edge of the bottom wall 141 and extending to be fixed to the upper cover 13.

Figure 5:
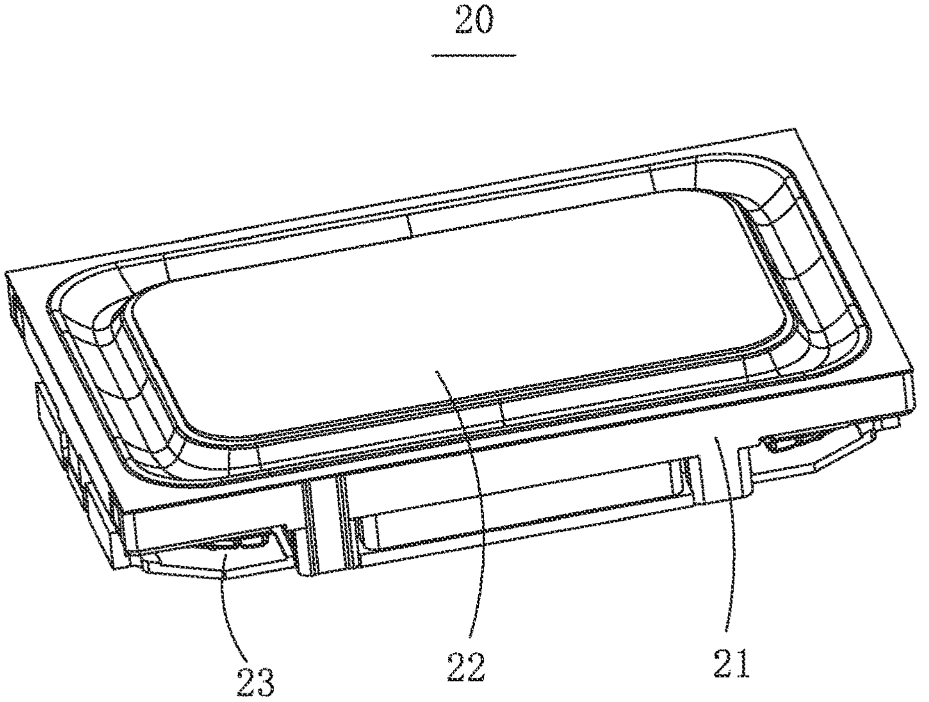
FIG. 5 is an isometric view of a speaker unit of the speaker box in FIG. 1.
Figure 6:
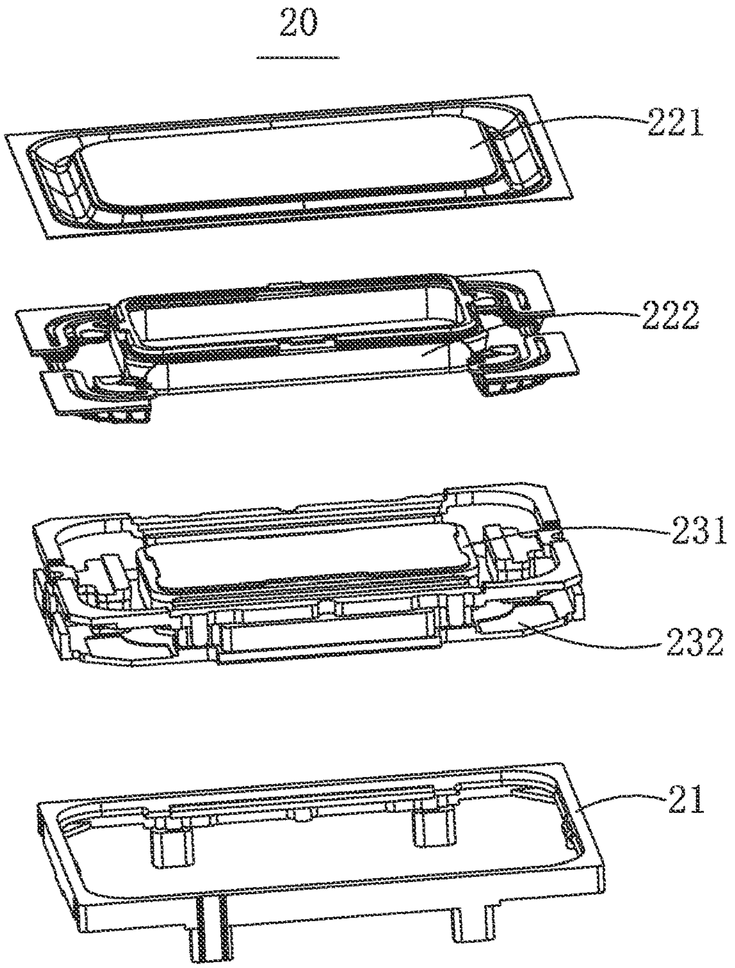
FIG. 6 is an exploded view of the speaker unit in FIG. 5.
Figure 7:
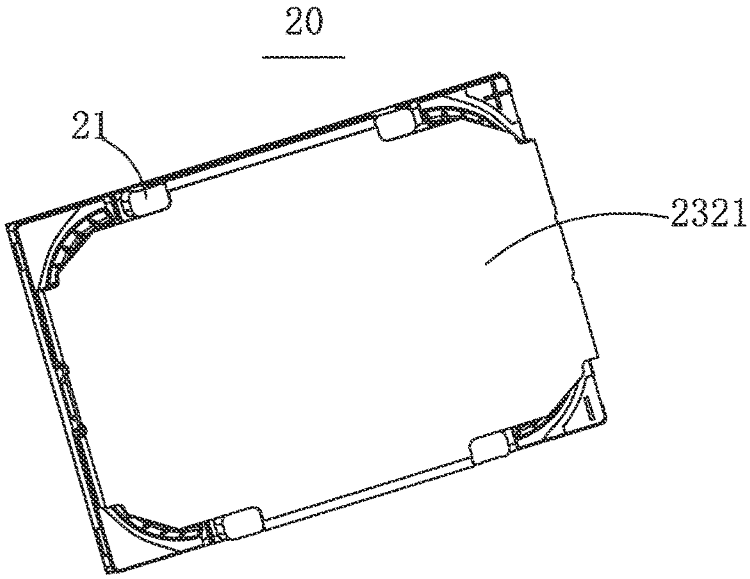
FIG. 7 is an isometric view of the speaker unit in FIG. 5 in another perspective.

As shown in FIGS. 5-7, in one embodiment, the speaker unit 20 includes frame 21, a vibration system 22 mounted on the frame 21, and a magnet system 23 configured to drive the vibration system 22 to generate sound. Specifically, the vibration system 22 includes a diaphragm 221 fixed to the upper cover 13 and configured to vibrate to generate sound, and a coil 222 driven the diaphragm 221. The magnet system 23 includes a magnet 231 and a yoke 232 supporting the magnet 231. It should be noted that the specific structure of the speaker unit 20 is not limited in the present disclosure as long as it can generate sound normally.

In one embodiment, the yoke 232 and the bottom wall 141 are arranged at an interval. In addition, the diaphragm 221 is fixed to the upper cover 13 and disposed opposite to the sound hole 12. The front cavity 111 is encircled by the diaphragm 221 and the upper cover 13.

The speaker box 100 further includes a support member 30 received in the rear chamber 112. The support member 30 includes a first fixation portion 31 fixed to the speaker unit 20, a second fixation portion 32 fixed to the housing 10, and a support portion 33 connecting the first fixation portion 31 and the second fixation portion 32. In particular, the first fixation portion 31 is fixed to the yoke 232, and the second fixation portion 32 is welded to the housing 10. The yoke 232 includes a bottom surface 2321 away from the diaphragm 221 along the vibration direction. The first fixation portion 31 is welded to the bottom surface 2321, and the second fixation portion 32 is welded to a surface of the side wall 142 facing the receiving space 11.

Understandably, even if more than one speaker units 20 are provided in the speaker box 100, they can be well fixed to the housing 10. In one embodiment, the speaker box 100 includes two speaker units 20 which are stably fixed to the housing 10 through the support member 30. The two speaker units 20 can be integrally assembled or separately assembled.

As shown in FIGS. 3-4, the support member 30 further includes a first arch portion 34 connecting the first fixation portion 31 and the support portion 33, and a second arch portion 35 connecting the second fixation portion 32 and the support portion 33; the support portion 33 is spaced apart from the bottom surface 2321 along the vibration direction. Concretely, the support portion 33 and the first fixation portion 31 are located on different surfaces, thereby forming an altitude difference along the vibration direction. By providing the first arch portion 34 and the second arch portion 35, the reliability of the support member 30 is effectively improved. Furthermore, along the vibration direction, a projection of the support portion 30 overlaps with a projection of the bottom surface 2321.

In one embodiment, the housing 10 is in a rectangular shape. The side wall 142 includes two first wall 1421 opposite to each other and two second wall 1422 opposite to each other. Besides, the support member 30 includes two second fixation portions 32; each of the two second fixation portions 32 fixedly connects to one first wall 1421 separately. Obviously, the support member 30 extends from one first wall 1421 to the other first wall 1421. The first wall 1421 extends a long axis. In addition, the first fixation portion 31 includes a hollow portion 311 penetrating thereon along the vibration direction. Owing that the support member 30 is metallic, providing the hollow portion 311 on the support member 30 can lighten the support member 30 and ensure its fixation strength simultaneously, thus lightening the speaker box 100.

Moreover, the speaker box 100 includes a circuit board 40 electrically connected the speaker unit 20 with an external circuit.

Compared with the related art, a support member is arranged in the rear chamber to connect the speaker unit and the housing; the first fixation portion of the support member is fixedly connected to the yoke, and the second fixation portion is fixedly connected to the housing, thus achieving fixation between the speaker unit and the housing. In this manner, by improving the fixation strength between the speaker unit and the housing, the drop reliability of the speaker box is effectively improved, thereby prolonging the life of the speaker box.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box comprising:

a housing, having a receiving space;

a speaker unit mounted on the housing and dividing the receiving space into a front chamber and a rear chamber isolated from each other, comprising:

a diaphragm configured to vibrate to generate sound, enclosing the front chamber with the housing; and a yoke spaced apart from the housing;

a support member received in the rear chamber, comprising a first fixation portion fixed to the speaker unit, a second fixation portion fixed to the housing, and a support portion connecting the first fixation portion and the second fixation portion; wherein a sound hole is provided on the housing configured to connect the front chamber with outside; the first fixation portion is fixed to the yoke;

the yoke comprises a bottom surface away from the diaphragm along a vibration direction; the first fixation portion is welded to the bottom surface; the second fixation portion is welded to the housing.

2. The speaker box as described in claim 1, wherein the support member further comprises a first arch portion connecting the first fixation portion and the support portion, and a second arch portion connecting the second fixation portion and the support portion; the support portion is spaced apart from the bottom surface along the vibration direction.

3. The speaker box as described in claim 1, wherein the housing comprises an upper cover having the sound hole, and a bottom cover enclosing the receiving cavity with the upper cover; the second fixation portion is fixed to the bottom cover.

4. The speaker box as described in claim 3, wherein the bottom cover comprises a bottom wall spaced apart from the bottom surface of the yoke along the vibration direction, and a side wall bending from outer edge of the bottom wall and extending to be fixed to the upper cover; the second fixation portion is welded to the side wall.

5. The speaker box as described in claim 4, wherein the housing is in a rectangular shape; the side wall comprises two first wall opposite to each other and two second wall opposite to each other; the support member comprises two second fixation portions; each of the two second fixation portions fixedly connects to one first wall separately.

6. The speaker box as described in claim 5, wherein the first wall extends along a long axis.

7. The speaker box as described in claim 5, wherein the first fixation portion comprises a hollow portion penetrating thereon along the vibration direction.

8. The speaker box as described in claim 1, wherein a projection of the support portion overlaps with a projection of the bottom surface along the vibration direction.

* * * * *